Patented Jan. 13, 1931

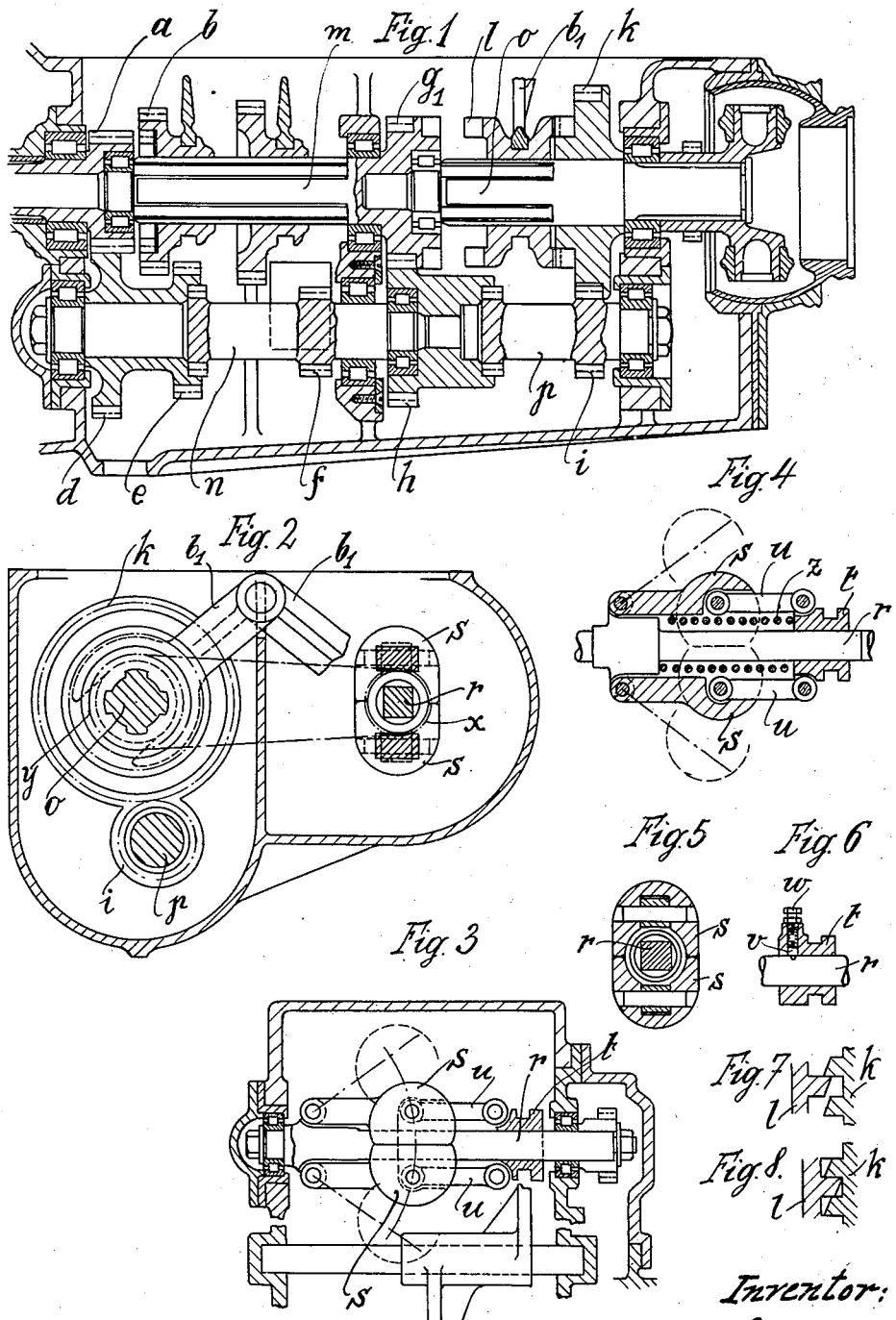

1,789,053

UNITED STATES PATENT OFFICE

WALTER SCHUDEISKY, OF BREMEN, GERMANY

CHANGE SPUR GEARING ESPECIALLY FOR MOTOR CARS

Application filed February 17, 1930, Serial No. 428,934, and in Germany February 20, 1929.

This invention relates to a change spur gearing, especially for motor cars, of which the two highest change steps are automatically engaged.

Since the introduction of the first motor car science has continually been endeavouring to increase the safety and especially to simplify its driving.

In this respect the transmission of power from the engine to the car wheels occupies the leading position, which transmission in modern cars is effected by change spur gearing.

This change spur gearing has passed through many changes in recent years, which served particularly for facilitating the guiding, the number of forward speeds being reduced from 4 to 3 which has been rendered possible by the increased power of the engine.

The engaging of the different speeds remains however always a troublesome duty for the driver, especially for the beginner, which often can be only carried out after a great deal of practice.

In order to overcome this objection, many inventors have constructed change spur gearings, in which the shifting of the individual speeds is effected automatically by a centrifugal weight governor. However, owing to the fact that all speeds are to be controlled, the mechanism was too complicated and consequently could not be adapted in practice.

As compared therewith, the present invention intends only to automatically control the two highest speeds which, when travelling through a village or town, have to be changed most frequently.

An embodiment of the invention is illustrated by way of example in the accompanying drawing in which:

Fig. 1 shows the change spur gearing in longitudinal section.

Fig. 2 is a cross section through the casing showing the centrifugal governor and the gearing.

Fig. 3 is a longitudinal section of the centrifugal governor.

Fig. 4 shows the centrifugal governor in inoperative position.

Fig. 5 is an end view of the governor.

Fig. 6 shows the brake locking device and

Figs. 7 and 8 show the teeth of the double sided clutch.

The invention relates to a gearing with three forward and one reverse speeds in which the operation is as follows:

When starting up the engine a spur wheel $a$ and the first countershaft $n$ with the spur wheels $d$, $e$ and $f$ (Fig. 1) are rotated. For starting the car the spur wheels of the first speed $b$ and $e$ are brought into mesh by hand, whereby the first main shaft $m$ is connected with the spur wheel $g_1$ and thereby the second countershaft $p$ with the spur wheels $h$ and $i$.

The double sided clutch sleeve $l$, which is arranged shiftable in key ways on the second main shaft $o$ forms with the lateral teeth of the spur wheels $k$ and $g_1$ a double clutch gear, the teeth of which are shown in Figs. 7 and 8. When starting in the first speed the clutch sleeve $l$ is further in engagement with the spur wheel $k$ running idle on the second main shaft $o$. Consequently, when the second countershaft $p$ rotates, the spur wheels $i$ and $k$, the clutch sleeve $l$ and the second main shaft $o$, being connected therewith through the key ways, rotate, the latter with the Cardan head mounted thereon. The car will then start moving. The first speed consists therefore chiefly of the transmissions through the spur wheels $e$ and $b$ and the spur wheels $i$ and $k$. If it is desired to engage the second speed, the spur wheel $b$ is engaged by hand with the spur wheel $a$ (direct engagement). The main shaft $m$ with the spur wheel $g_1$ thereby attains the same revolving speed as the crank shaft of the engine. The transmission for the second speed is formed by the spur wheels $i$ and $k$. The spur wheel $k$ rotates the clutch sleeve $l$ and thereby the second main shaft $o$. If this second main shaft $o$ exceeds a certain number of revolutions per minute, the coupling sleeve $l$ is automatically forced into engagement with the spur wheel $g_1$, so that a direct connection of the two main shafts $m$ and $o$ or between engine and Cardan head is obtained. The third or direct speed is engaged. This alternating engagement of the clutch sleeve $l$ in the spur wheel $k$ (second speed) and in the spur wheel $g_1$ (third speed) is effected by a known centrifugal governor which is arranged in a separate chamber at the side of the centre compartment (Figs. 2 and 3).

The special effect of the centrifugal governor (Figs. 3, 4 and 5) is as follows:—

On a shaft $r$ two centrifugal weights $s$ are arranged so that they are pressed together in the inoperative position by a spring $z$ (Fig. 4) and surround the shaft $r$. The drive of the shaft $r$ is effected by a sprocket chain which connects the sprocket wheel $y$ on the main shaft $o$ with the sprocket wheel $x$ on the governor shaft $r$. This drive of the governor from the driven shaft is known for displacing the chain spur gearing.

In order to enable the centrifugal weights $s$ to be swung outwards and inwards not slowly but suddenly on the shaft $r$ attaining a certain speed, one (or two) brake lock $v$ (Fig. 6) is arranged in the sliding head $t$, which is reciprocated by the rods $u$. This brake lock consists of a wedge shaped part $v$ which engages by the pressure of a spring with adjusting screw $w$ into a transverse slot in the shaft $r$ and can be adjusted. Up to a certain speed of the Cardan shaft and therefore of the second main shaft $o$, which corresponds to a running speed of the car of about 10 kms. per hour, the centrifugal force of the weights $s$ is arrested by the spring $z$ (Fig. 4) and the brake lock $v$. If this speed of rotation is exceeded, the centrifugal weights $s$ swing suddenly outwards and carry along the slidable head $t$ (Fig. 3).

As the slidable head $t$ is connected by means of a double forked lever $b_1$ (Figs. 2 and 3) with the clutch sleeve $l$ (Fig. 1), the centrifugal weights $s$ carry along the clutch sleeve $l$ when swinging out and engage the spur wheel $g_1$ (third or direct speed). The brake lock of the slidable head $t$ thereby engages in a second, deeper transverse groove in the shaft $r$ and holds the centrifugal weights $s$ in this position until the speed of rotation of the shaft $r$ has gone back to a speed in proportion to a speed of the car of about 10 kms. per hour. When this speed has been attained the spring $z$ (Fig. 4) can press the brake lock out of the transverse groove. The centrifugal weights come quickly together to press the slidable head $t$ to the other side and the clutch sleeve $l$ into the spur wheel $k$ (Fig. 1) (second gear) by means of the double forked lever $b_1$.

The centrifugal weight governor therefore effects the shifting from the second into the third speed and vice versa during the running of the car this being of great importance when driving in towns.

If the ratio of transmission of the individual speeds is so selected that the elastic engine can set the car in movement at second speed on level streets (which to-day is already often possible), only a single engaging by hand (to the second speed) would be necessary on a level road, according to the invention, for passing from the stationary position into the highest speed. The first speed would only have to be engaged by hand when starting up on an upward gradient or in loose sand.

I claim:—

In a change speed gearing for vehicles having a plurality of driving speeds, and including a transmission shaft and toothed gear members for driving the vehicle at two different relatively high and low speeds, said gear members having clutch teeth, means for throwing said gear members into and out of driving action comprising a driven shaft, a sliding double clutch sleeve movable in opposite directions to engage one or the other of said gears to throw one into and the other out of driving action, and vice versa, a centrifugal governor carried by said shaft and embodying pivotally mounted weighted arms movable inwardly and outwardly with relation to said shaft, a sliding shifter sleeve on the shaft coupled to the clutch sleeve for transmitting opposite sliding motions in opposite directions to the clutch sleeve on opposite sliding motions of said shifter sleeve, a spring for sliding the shifter sleeve in one direction and drawing the governor arms inwardly on a predetermined reduction of speed and for opposing outward movement of the governor arms and shifter sleeve under centrifugal force when such predetermined speed is exceeded, and locking means for connecting said shifter sleeve to said shaft in the positions in which the clutch sleeve at different predetermined speeds of said transmission shaft respectively throws one of the gears into action and the other out of action, said locking means being operative to release said shifter sleeve from connection with the driven shaft under predomination pressures resulting from centrifugal force and the force of the spring, respectively.

In testimony whereof I affix my signature.

WALTER SCHUDEISKY.